W. L. BROWN.
Lamp Stove.
No. 93,961. Patented Aug. 24, 1869.
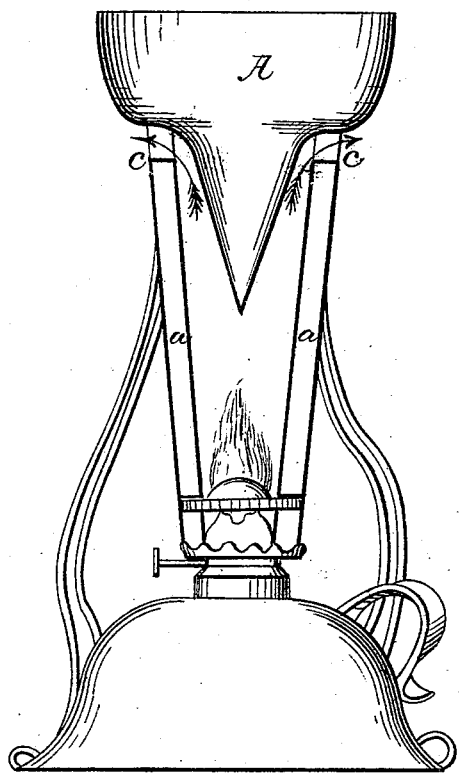
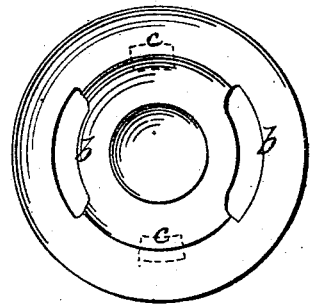
Witnesses.
C. D. Gilmore
J. C. Smith
Inventor.
Willis L. Brown
by his attorneys
Gardiner & Hyde

United States Patent Office.

WILLIS L. BROWN, OF SHELBURNE FALLS, MASSACHUSETTS, ASSIGNOR TO HIMSELF AND SAMUEL W. BOWEN, OF SAME PLACE.

Letters Patent No. 93,961, dated August 24, 1869.

IMPROVEMENT IN HEATERS FOR KEROSENE-LAMPS.

The Schedule referred to in these Letters Patent and making part of the same.

To all whom it may concern:

Be it known that I, WILLIS L. BROWN, of Shelburne Falls, Franklin county, Commonwealth of Massachusetts, have invented a new and improved Heater for Use with Kerosene-Lamps using the broad-base chimney, commonly known as sun-burners, comet-burners, &c., of which the following is a full and exact description, reference being had to the accompanying drawings, and to letters of reference marked thereon.

In the drawings—

Figure 1 is a plan, and

Figure 2, a sectional view of my invention, the construction of which I will now describe.

In place of the chimney, I use the water-holder A, enclosing the flame and ascending current of heated air by a jacket of water, a.

This water-holder is enlarged at the top, so as to hold a considerable quantity of water, and this enlarged upper part is in form of a cup, communicating with the jacket a by openings b b in the bottom of the cup.

Also, in the centre of the bottom of the cup is a conical depression, pointing downward into the heated current rising from the lamp.

The draught from the lamp passes at the top, by the above-mentioned conical depression, and beneath the cup, through openings c c in the water-jacket, so that none of its heating-effects are lost.

By this construction, it will be seen that I obtain a great amount of heating-surface without in any way interfering with the draught.

First, the most important heating-surface is that of the conical depression in the bottom of the cup, which, projecting down into the centre of the rising current of heated air, and containing but little liquid compared with the outside surface presented to the flame, greatly reduces the time of heating the fluid contained in the whole vessel.

Second, the jacket around the flame and ascending current absorbs much of the rising heat, and the passage out through the broad openings c c, beneath the cup, causes the remaining heat to rise around the cup, and much of it is absorbed by the bottom and sides.

By the foregoing description it will be seen that I have a neat and compact heater, of simple construction, not liable to get out of order or be clogged in its draught, as all the passages can be got at easily for cleaning and removing soot, &c, and which, from the great amount of heating-surface exposed, is very effective.

This heater, although especially designed for kerosene-lights, as described, may be used in the same construction over other flames, as gas, alcohol, &c.

And now, having described my invention,

What I claim as new, and desire to secure by Letters Patent, is—

As a new article of manufacture, the water-heater herein described, consisting of the holder A, with its conical depression, the tapering passage for the flame and products of combustion, with its water-jacket d d and openings c c, adapted for use in connection with a kerosene-lamp, as set forth.

WILLIS L. BROWN.

Witnesses:
J. B. GARDINER,
SAML. W. BOWEN.